(12) United States Patent
Lee (10) Patent No.: US 11,343,444 B2
(45) Date of Patent: May 24, 2022

(54) IMAGING APPARATUS COMPRISING IMAGE-CAPTURING UNIT CAPABLE OF CAPTURING A TIME SLICE IMAGE

(71) Applicant: LEEPLAY CO., LTD., Seoul (KR)

(72) Inventor: Doyub Lee, Seoul (KR)

(73) Assignee: LEEPLAY CO., LTD., Seoul (KR)

( * ) Notice: Subject to any disclaimer, the term of this patent is extended or adjusted under 35 U.S.C. 154(b) by 0 days.

(21) Appl. No.: 17/269,548

(22) PCT Filed: Nov. 13, 2018

(86) PCT No.: PCT/KR2018/013771
§ 371 (c)(1),
(2) Date: Feb. 19, 2021

(87) PCT Pub. No.: WO2020/040354
PCT Pub. Date: Feb. 27, 2020

(65) Prior Publication Data
US 2021/0360171 A1  Nov. 18, 2021

(30) Foreign Application Priority Data
Aug. 22, 2018  (KR) .......................... 10-2018-0097986

(51) Int. Cl.
*H04N 5/225* (2006.01)
*H04N 5/247* (2006.01)

(52) U.S. Cl.
CPC ........... *H04N 5/247* (2013.01); *H04N 5/2252* (2013.01); *H04N 5/2253* (2013.01)

(58) Field of Classification Search
CPC .................................................... H04N 5/247
See application file for complete search history.

(56) References Cited

U.S. PATENT DOCUMENTS 6,933,966 B2 * 8/2005 Taylor .................. G03B 19/026
                                              348/159
8,531,580 B2 * 9/2013 Choi .................. H04N 5/23238
                                              348/340

(Continued)

FOREIGN PATENT DOCUMENTS

KR          100997877       12/2010
KR          20110087586      8/2011

(Continued)

OTHER PUBLICATIONS

International Search Report—PCT/KR2018/013771 dated May 17, 2019.

*Primary Examiner* — Gary C Vieaux
(74) *Attorney, Agent, or Firm* — Cantor Colburn LLP (57) ABSTRACT

Provided is an imaging apparatus including at least one or more imaging units, and more particularly, to an imaging apparatus including at least one or more imaging units which includes at least one or more modules to perform modularization so that a time-slice imaging device may be installed, performs a light weight of the imaging units to solve difficulty in a process of connecting multiple heavy digital single lens reflex (DSLR) cameras to each other in order to realize a time-sliced image at a certain moment, achieves assembly simplicity and storage convenience through a structure that may be stored by separating the modules and a support, and achieves popularization of an imaging apparatus capable of capturing a time slice image.

7 Claims, 10 Drawing Sheets

(56) References Cited

U.S. PATENT DOCUMENTS

| | | | | |
|---|---|---|---|---|
| 8,654,177 | B2 * | 2/2014 | Kim | H04N 13/243 |
| | | | | 348/36 |
| 9,182,228 | B2 * | 11/2015 | Pollock | H04N 5/23299 |
| 2007/0285558 | A1 * | 12/2007 | Oohara | H04N 5/23258 |
| | | | | 348/345 |
| 2010/0007714 | A1 * | 1/2010 | Kim | H04N 5/2254 |
| | | | | 348/36 |
| 2013/0050401 | A1 * | 2/2013 | Tannhaeuser | H04N 5/247 |
| | | | | 348/36 |
| 2014/0182925 | A1 * | 7/2014 | Jang | H05K 13/00 |
| | | | | 174/382 |

FOREIGN PATENT DOCUMENTS

| | | | | |
|---|---|---|---|---|
| KR | 101549139 | | 9/2015 | |
| KR | 20160070969 | | 6/2016 | |
| KR | 20170127104 | | 11/2017 | |
| KR | 1020170127104 | * | 11/2017 | ....... G08B 13/19617 |

* cited by examiner

IMAGING APPARATUS COMPRISING IMAGE-CAPTURING UNIT CAPABLE OF CAPTURING A TIME SLICE IMAGE

BACKGROUND

1. Field

The present disclosure relates to an imaging apparatus including at least one or more imaging units, and more particularly, to an imaging apparatus including at least one or more imaging units which includes at least one or more modules to perform modularization so that a time-slice imaging device may be installed, performs a light weight of the imaging units to solve difficulty in a process of connecting multiple heavy digital single lens reflex (DSLR) cameras to each other in order to realize a time-sliced image at a certain moment, achieves assembly simplicity and storage convenience through a structure that may be stored by separating the modules and a support, and achieves popularization of an imaging apparatus capable of capturing a time slice image.

2. Description of Related Art

Video special effect techniques of the related art include a time slice technique, a 360-degree panoramic video technique, and so on.

Time slice imaging indicates an imaging technique that makes a still or sequential motion of a subject appear as if the motion is imaged by a video imaging unit by installing multiple imaging units for taking pictures of a subject at various angles to press a shutter at the same time to take pictures and then connect the imaging unit to edit. The time slice imaging technique is widely used in production of movies, dramas, or documentaries.

In the related art, multiple imaging units are arranged around a subject at various angles for time slice imaging, and then a shutter release capable of operating a shutter is connected to each of the multiple imaging units, and cables of the multiple shutter releases are collected and operation buttons connected to each of the cables are simultaneously operated, and thereby, shutters of multiple imaging units are operated simultaneously.

However, since dozens of imaging units are generally used for time slice imaging, dozens of shutter releases corresponding thereto are required. Accordingly, in order to simultaneously operate the dozens of imaging units, operation buttons of the dozens of shutter releases have to be simultaneously pressed. However, it is practically impossible for a photographer to press the dozens of operation buttons at the same time, and thus, there is a problem that an irregular time difference occurs in shutter operation of the dozens of imaging units.

In addition, since the dozens of imaging units are each provided as an individual digital camera, there is difficulty in carrying all of the digital cameras for time-slice imaging and preparing a separate line for connecting the cameras, and although heights of the dozens of imaging unit have to be uniformly set, an operator measures the height of the imaging units one by one or puts a rail at the bottom of the imaging units to level the rail, and thus, there is a problem that an installation work requires considerable manpower and time.

Therefore, in the relevant technical field, there is a need for technology development of an imaging apparatus including at least one or more imaging units that may solve difficulty in the process of connecting multiple heavy DSLR cameras in order to realize a time sliced image at a certain moment through modularization and weight reduction of the imaging units and may achieve ease of assembly and storage convenience of the entire configuration of the imaging apparatus.

SUMMARY

Based on means or specific content presented by the present disclosure, there is difficulty in carrying all of digital cameras for capturing a time slice image of the related art described above to prepare a separate line for connecting the cameras, and although heights of the dozens of imaging unit have to be uniformly set, an operator measures the height of the imaging units one by one or puts a rail at the bottom of the imaging units to level the rail, and thus, there is a problem that an installation work requires considerable manpower and time, and in order to solve the problem, the present disclosure provides an imaging apparatus including at least one or more imaging units.

Specifically, the present disclosure relates to an imaging apparatus including at least one or more imaging units which solves difficulty of connecting multiple heavy DSLR cameras by reducing weights of the imaging units composed of a minimum number of members including an imaging portion and a control board in order to realize a time-sliced image at a certain moment, achieves assembly simplicity and storage convenience through a structure that may be stored by separating a module and a support, and achieves popularization of an imaging apparatus capable of capturing a time slice image.

According to an embodiment of the present disclosure, an imaging apparatus may be provided which includes a module and a support connected to a lower portion of the module to fix the module and in which the module includes a module case constituting the outside of the module and at least two or more imaging units inside the module case.

The module may further include an angle adjustment unit that includes at least two or more modules connected to each other and adjusts an installation angle between the modules, and the angle adjustment unit may include multiple adjustment points that are fixed to a lower or upper portion of a module case, connect adjacent module cases to each other, and adjust an installation angle between the modules by considering a distance to a subject to be imaged.

The module case may further include a connection hole that is formed under the module case to connect the support to the module case, and the imaging unit may include an imaging body including a lens and an image sensor, and a control board connected to the imaging body to control the imaging body and to process imaging information.

In this case, the module case may include a cover that is formed on an upper surface of the module case and is attachable and detachable, and a position adjustment unit provided on the inner lower side of the module case to adjust an installation position of the imaging unit.

The support may include a connection portion formed on an uppermost end of the support so as to be fixed to the module case, and the support may include a height adjustment portion for adjusting a height of the module connected to an upper portion of the support.

At least two or more modules may be installed to be connected to each other and, and at least two or more modules are connected to each other to be coupled in a linear direction, and the module case may include an imaging unit angle adjustment unit that is provided on an inner lower side of the module case and adjusts an installation angle of the imaging unit.

By characteristics of a configuration described above, the present disclosure may reduce a weight by configuring an imaging unit with a minimum number of members including an imaging portion and a control board and may achieve assembly simplicity and storage convenience through a configuration in which a module and a support may be stored separately, and an imaging apparatus capable of capturing a time slice image miniaturized with a light weight may be widely supplied.

BRIEF DESCRIPTION OF THE DRAWINGS

The above and other aspects, features, and advantages of certain embodiments of the disclosure will be more apparent from the following description taken in conjunction with the accompanying drawings, in which.

Specifically, the present disclosure relates to an imaging apparatus including at least one or more imaging units which solves difficulty of connecting multiple heavy DSLR cameras by reducing weights of the imaging units composed of a minimum number of members including an imaging portion and a control board in order to realize a time-sliced image at a certain moment, achieves assembly simplicity and storage convenience through a structure that may be stored by separating a module and a support, and achieves popularization of an imaging apparatus capable of capturing a time slice image.

According to an embodiment of the present disclosure, an imaging apparatus may be provided which includes a module and a support connected to a lower portion of the module and in which the module includes a module case constituting the outside of the module and at least two or more imaging units inside the module case.

The module may further include an angle adjustment unit that includes at least two or more modules connected to each other and adjusts an installation angle between the modules, and the angle adjustment unit may include multiple adjustment points that are fixed to a lower or upper portion of a module case, connect adjacent module cases to each other, and adjust an installation angle between the modules by considering a distance to a subject to be imaged.

The module case may further include a connection hole that is formed under the module case to connect the support to the module case, and the imaging unit may include an imaging body including a lens and an image sensor, and a control board connected to the imaging body to control the imaging body and to process imaging information.

In this case, the module case may include a cover that is formed on an upper surface of the module case and is attachable and detachable, and a position adjustment unit provided on the inner lower side of the module case to adjust an installation position of the imaging unit.

The support may include a connection portion formed on an uppermost end of the support so as to be fixed to the module case, and the support may include a height adjustment portion for adjusting a height of the module connected to an upper portion of the support.

At least two or more modules may be installed to be connected to each other and, and at least two or more modules are connected to each other to be coupled in a linear direction, and the module case may include an imaging unit angle adjustment unit that is provided on an inner lower side of the module case and adjusts an installation angle of the imaging unit.

DETAILED DESCRIPTION

Hereinafter, some embodiments of the present disclosure will be described in detail with reference to exemplary drawings. In attaching reference numerals to components of each drawing, it should be noted that the same components are denoted by the same reference numerals as possible although illustrated in different drawings. In addition, in describing the embodiments of the present disclosure, if it is determined that a detailed description on a related configuration or function interferes with understanding of an embodiment of the present disclosure, a detailed description thereof is omitted.

In addition, in describing the components of the embodiments of the present disclosure, terms such as first, second, A, B, (a), and (b) may be used. These terms are only used to distinguish one component from another component, and nature, or order of the related components is not limited by the terms. When it is described that a component is "connected", "combined" or "coupled" to another component, it should be understood that the component may be directly connected or coupled to another component, or another component may also be provided therebetween.

Hereinafter, description on specific embodiments of the present disclosure will be described with reference to the drawings.

Figure 1:
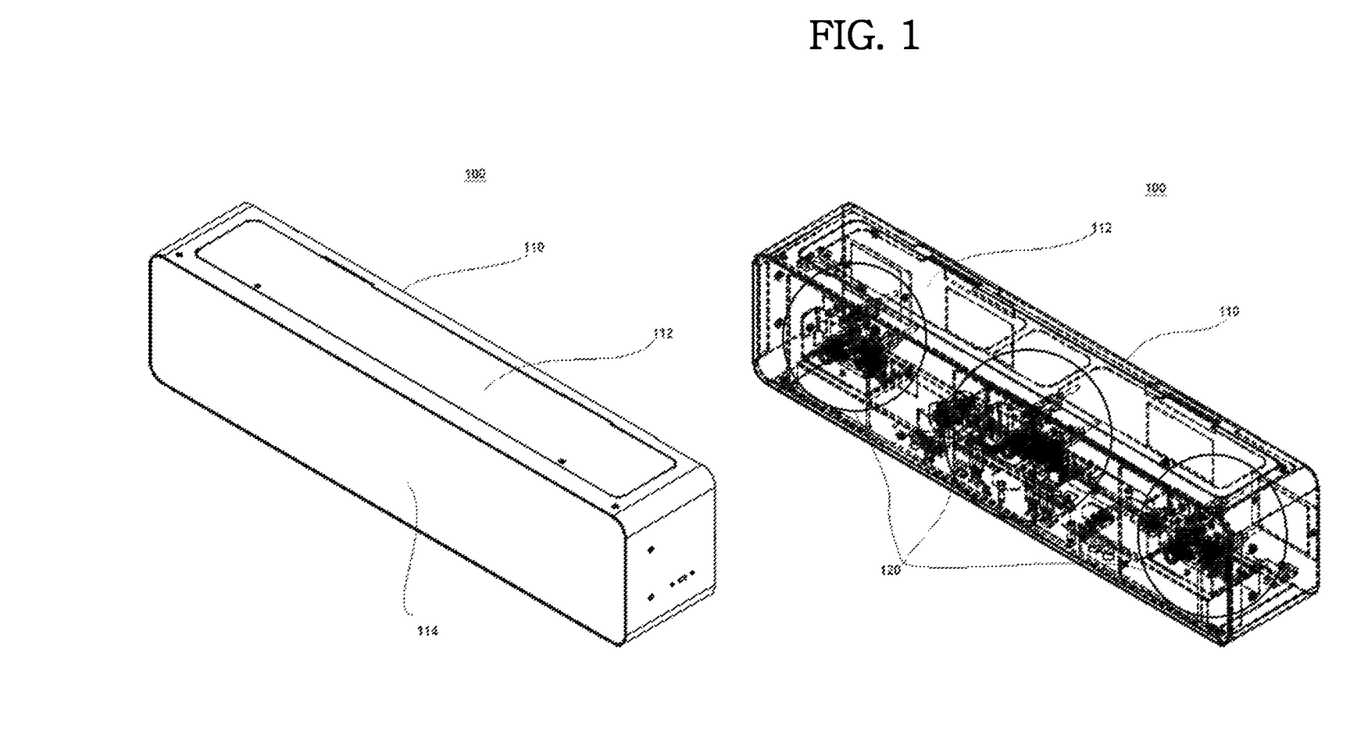
FIG. 1 illustrates a perspective view and a perspective projection view of an imaging apparatus including at least one or more imaging units, according to an embodiment of the present disclosure.
Figure 3A:
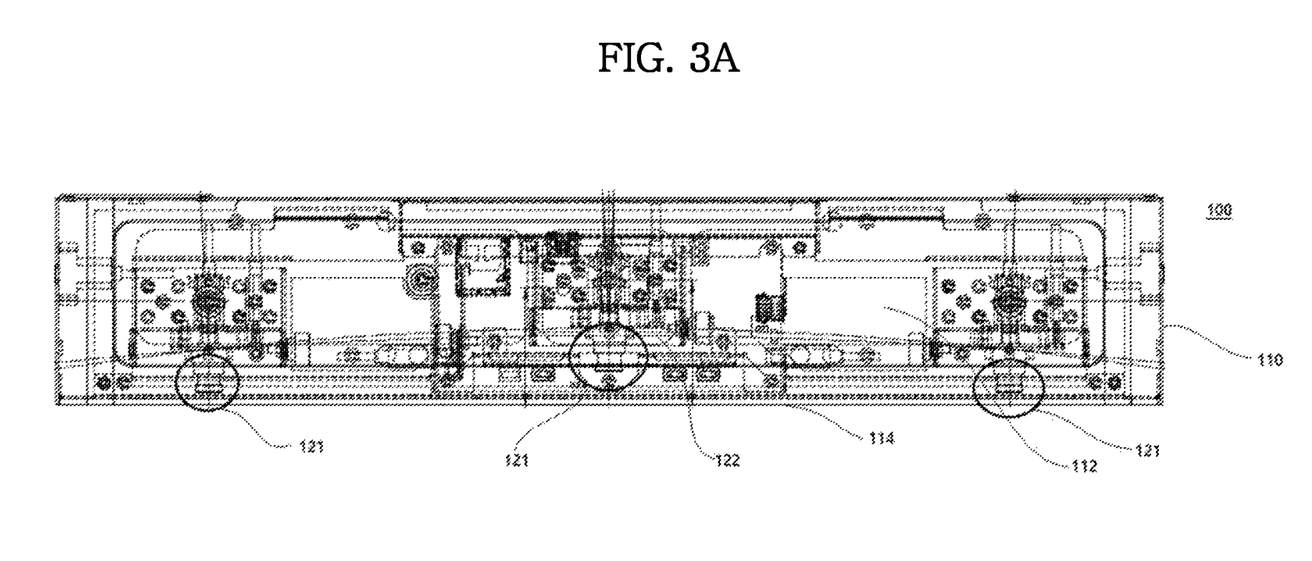
FIGS. 3A and 3B are a top projection view and a front projection view, respectively, of an imaging apparatus including at least one or more imaging units, according to an embodiment of the present disclosure.
Figure 3B:
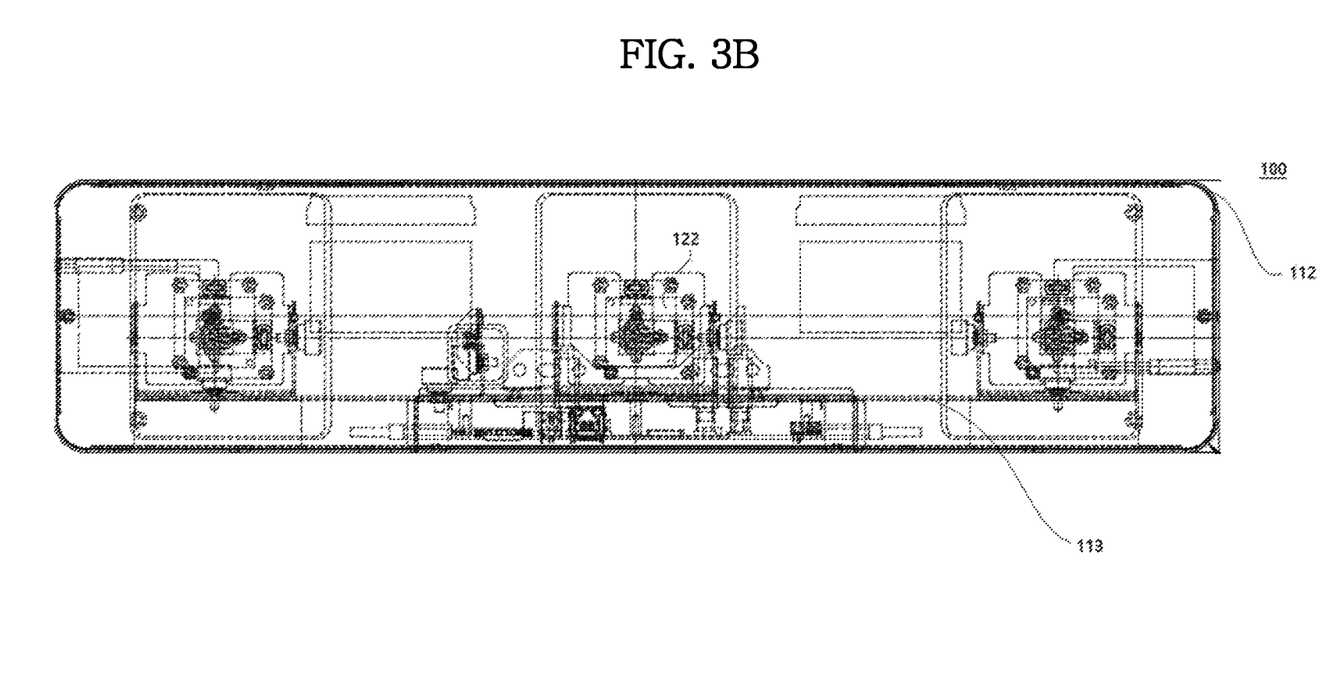

FIG. 1 illustrates a perspective view and a perspective projection view of an imaging apparatus including at least one or more imaging units, according to an embodiment of the present disclosure, and FIGS. 3A and 3B are a top projection view and a front projection view, respectively, of an imaging apparatus including at least one or more imaging units, according to an embodiment of the present disclosure.

Referring to FIGS. 1, 3A, and 3B, it is possible to confirm configurations of a module constituting the imaging apparatus according to the present disclosure and the imaging unit provided in the module.

Specifically, an imaging apparatus includes a module 100 and a support (not illustrated) connected to a lower portion of the module 100 to fix the module 100, and the module 100 includes a module case 110 constituting the outside of the module 100 and at least two imaging units 120 provided inside the module case 110.

The support may be connected to the lower portion of the module 100 to extend downward and may serve to help the module 100 to be stably installed by being spaced apart from the ground by a predetermined distance.

In this case, the module case 110 may further include a connection hole for being connected to the support under the module case 110.

The support may include a connection portion formed at an uppermost end of the imaging apparatus so as to be fixed to the module case 110.

The support may include a height adjustment unit for adjusting a height of the module connected to an upper portion of the imaging apparatus.

It is possible to perform imaging at an appropriate height by setting an imaging angle with a subject by adjusting the height adjustment unit.

In addition, it is possible to arrange one or more imaging units 120 inside the module case 110 and to arrange the imaging units 120 to form an arc centered on one subject by adjusting an installation position or an installation angle of each imaging unit 120.

A specific configuration of the imaging unit 120 will be described below with reference to FIGS. 2A to 2C.

Figure 2A:
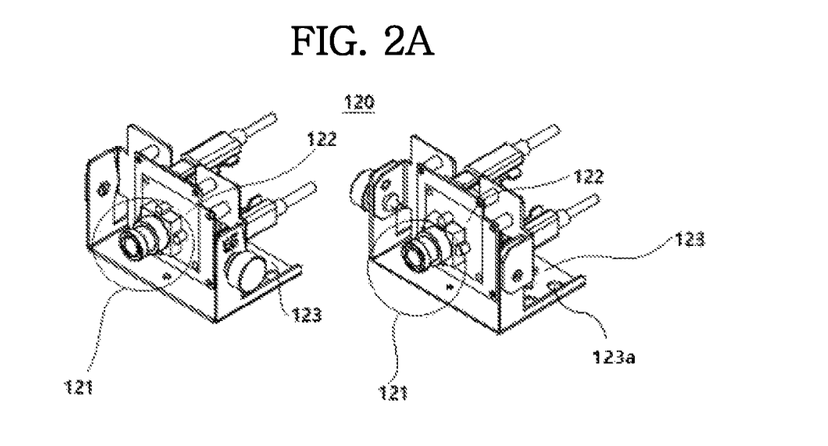
FIGS. 2A to 2C are perspective views, top views, and side views, respectively, of an imaging unit included in an imaging apparatus according to an embodiment of the present disclosure.
Figure 2B:
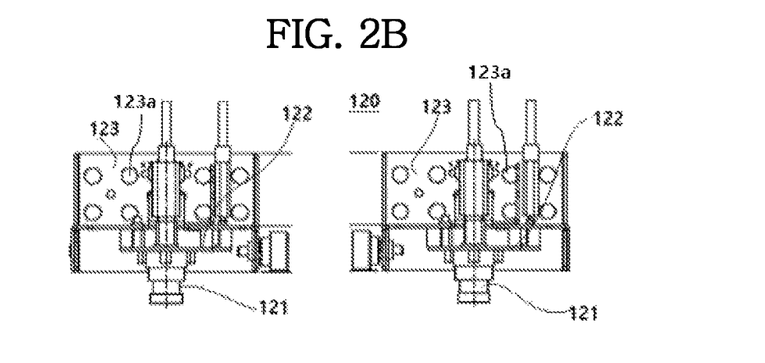
Figure 2C:
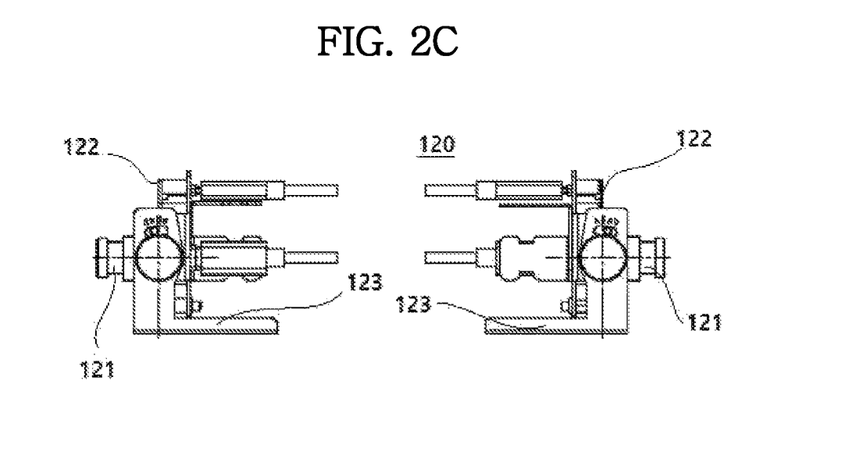

FIGS. 2A to 2C are perspective views, top views, and side views of an internal imaging unit 120 of an imaging apparatus according to an embodiment of the present disclosure.

FIGS. 2A to 2C illustrate a specific configuration of the imaging unit 120 provided in the module case 110. FIG. 2A illustrates perspective views, FIG. 2B illustrates top views, and FIG. 2C illustrates side views.

More specifically, the imaging unit 120 may include an imaging body 121 having a lens and an image sensor, a control board 122 connected to the imaging body 121 to control the imaging body 121 and process imaging information, and a fixing plate 123 having multiple processing holes to be fixed onto an inner lower side of the module case 110.

The control board 122 may transmit and receive a signal by performing a direct control, a remote control, a timer control, or so on, and control an operation of the imaging body 121 according to the corresponding signal, and control imaging conditions.

In addition, multiple processing holes may be formed in the fixing plate 123 so as to perform an operation of the imaging body 121 in the front-rear direction based on a subject, and the imaging body 121 may be stably fixed by connecting the processing holes formed in the fixing plate 123 to a position adjustment unit 113 provided on an inner lower side of the module case 110.

The imaging unit 120 may have a form in which the imaging body and the control board that are optionally symmetrical are combined with each other.

FIGS. 3A and 3B are a top view and a front view, respectively and illustrate that the imaging unit 120 located at the inner center of one module case 110 is spaced apart from a subject by a predetermined distance more than the imaging units located at the left and right of the central imaging unit such that the imaging unit 120 of the present disclosure has an arc shape having a constant distance to the subject.

In this case, the module case 110 may include a cover 112 that is formed on an upper surface of the module case 110 and is attachable and detachable, a position adjustment unit 113 provided on an inner lower side of the module case 110 to adjust an installation position of the imaging unit 120, and a front plate 114 for covering a front surface of the module case facing the imaging unit.

Referring to FIGS. 1 to 3B, the attachable/detachable cover 112 may be configured to insert the imaging unit 120 into the module case 110 and fix thereto, and the front plate 114 capable of protecting the imaging body 121 of the imaging unit 120 and applying an effect of polarization or the like to imaging of the imaging body 121 may be added to a front surface of the module 100.

In addition, a separate connection port and the like for a systemic connection between the modules 100 or a connection with an integral control unit that integrally controls the modules 100 may be added to a side of the module case 110.

Figure 4A:
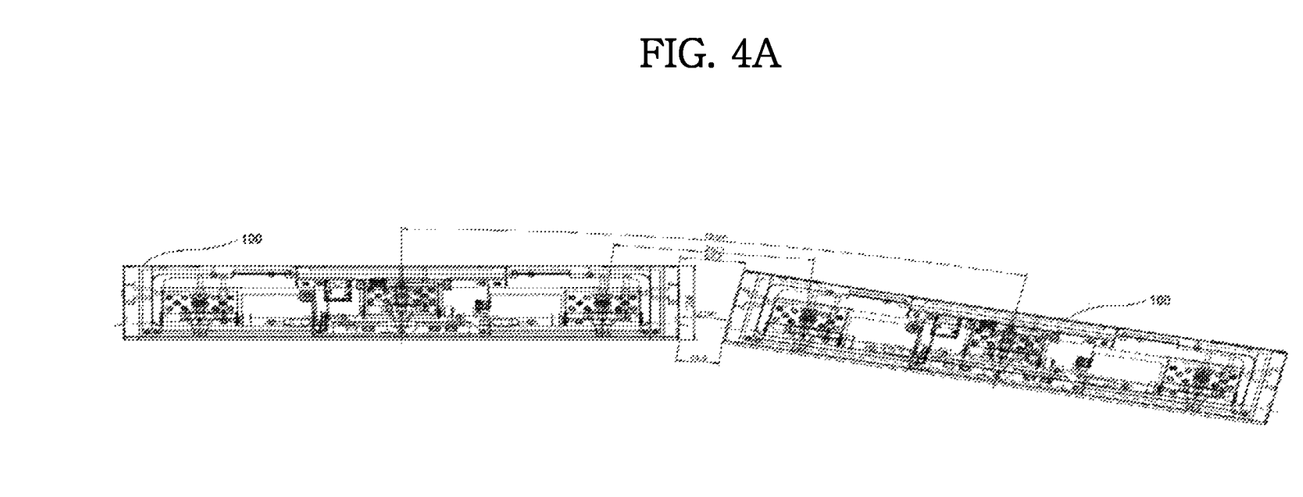
FIGS. 4A and 4B are top projection views illustrating a shape in which modules of an imaging apparatus including at least one or more imaging units form a predetermined installation angle and are connected to each other, according to an embodiment of the present disclosure.
Figure 4B:
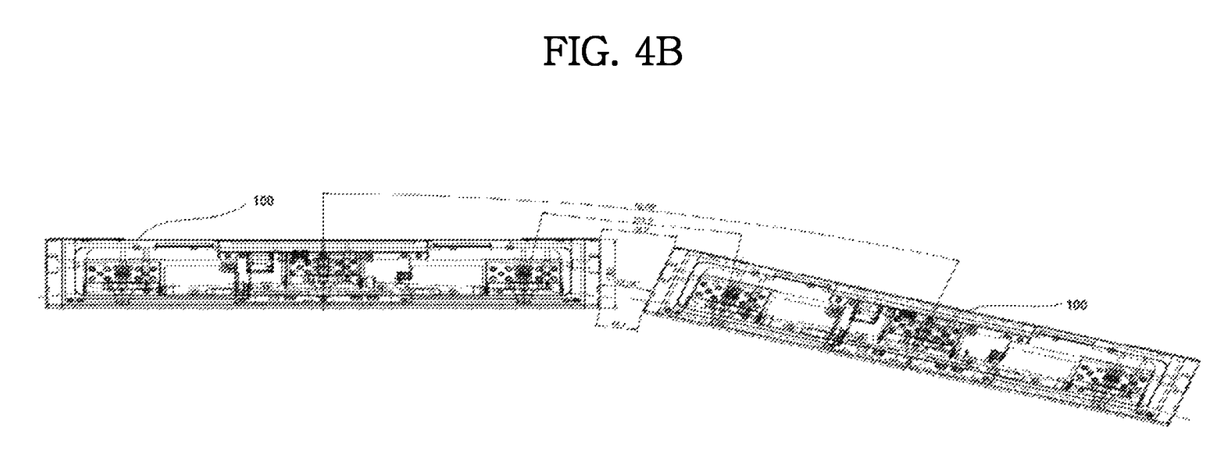

FIGS. 4A and 4B are top projection views illustrating a shape in which modules of an imaging apparatus including at least one or more imaging units 120 form a predetermined installation angle and are connected to each other, according to an embodiment of the present disclosure.

Referring to FIGS. 4A and 4B, configurations of the connected modules 100 including imaging units are illustrated according to an embodiment of the present invention, and each of the configurations has an arc formed with a radius of a predetermined distance from a subject.

In this case, at least two or more modules 100 may be connected to each other, and each of the modules 100 may further include a module angle adjustment unit (not illustrated) that adjusts an installation angle between the modules 100.

The module angle adjustment unit may be fixed to a lower portion or an upper portion of the module case 110 and may have multiple points that connect adjacent module cases 110 to each other and are able to adjust an installation angle between the modules 100 by considering a distance to a subject to be imaged.

More specifically, a module angle adjustment unit capable of providing a guide may be provided to maintain a horizontal level during installation of the modules and to be easily connected by a general user.

The module angle adjustment unit is preferably provided with an arc-shaped configuration provided between the modules 100 that are connected to each other, and is preferably divided into at least two pieces to adjust an arc angle of the arc-shaped configuration.

Accordingly, in FIGS. 4A and 4B, a case in which radiuses to a subject imaged by the imaging units 120 are 3000 mm and 2000 mm is exemplified to illustrate a state in which an installation angle between the modules 100 is adjusted A general person may provide a table of an installation angle for connecting modules to each other according to a distance to a subject by using multiple adjustment points provided in the module angle adjustment unit, and thus, the installation angle may be easily detected and guided.

In addition, the mutual module angle adjustment unit includes a coupling tooth jig of a tooth shape on the left and right of the module case 110 so that an installation angle of the module case or the module may be adjusted through coupling and angle adjustment of the coupling tooth jigs. In this case, a separate connection portion casing for protecting the coupling tooth jig is preferably added.

Figure 5:
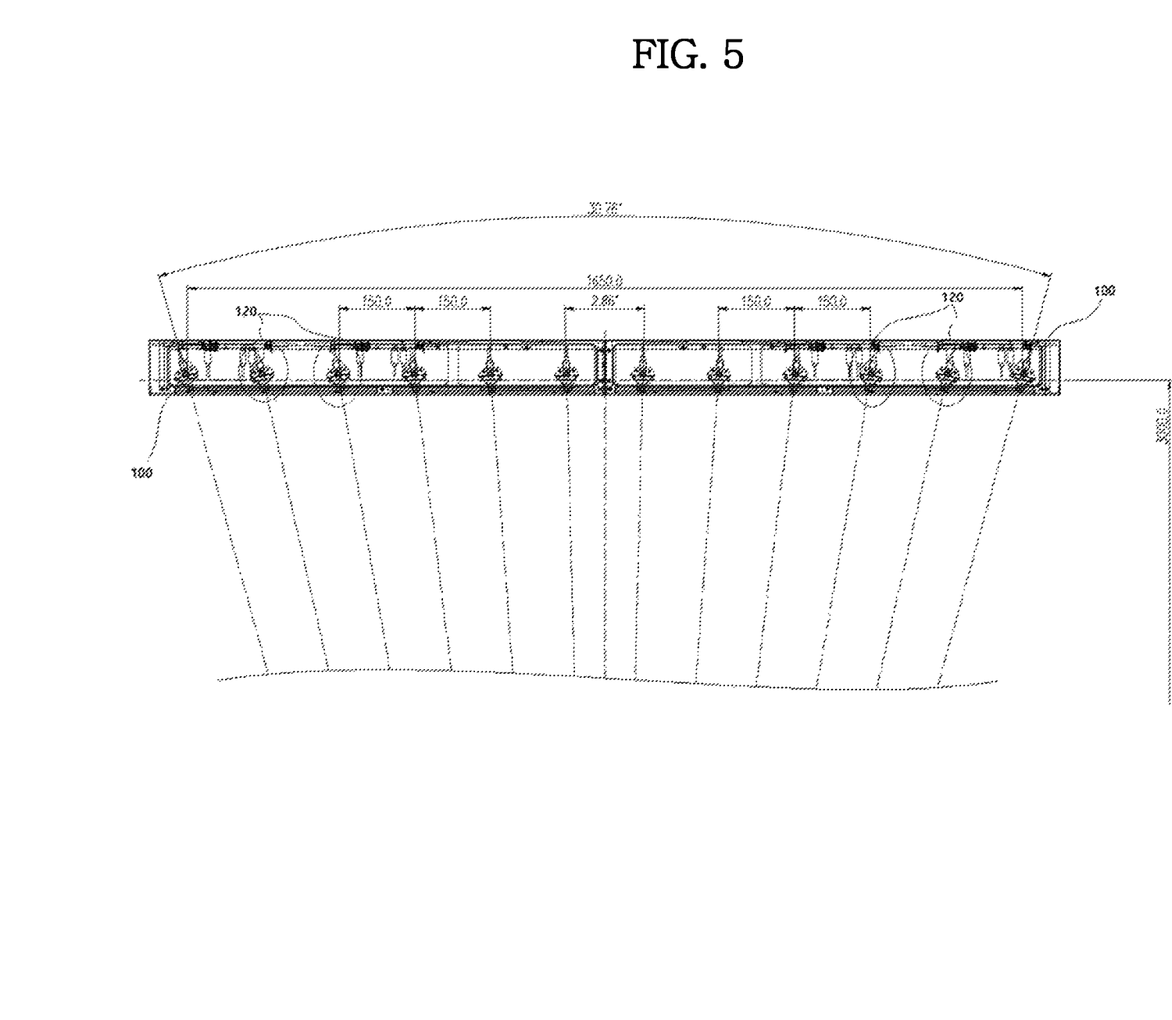
FIG. 5 is a top projection view of an imaging apparatus including at least one or more imaging units, according to an embodiment of the present disclosure.
Figure 6A:
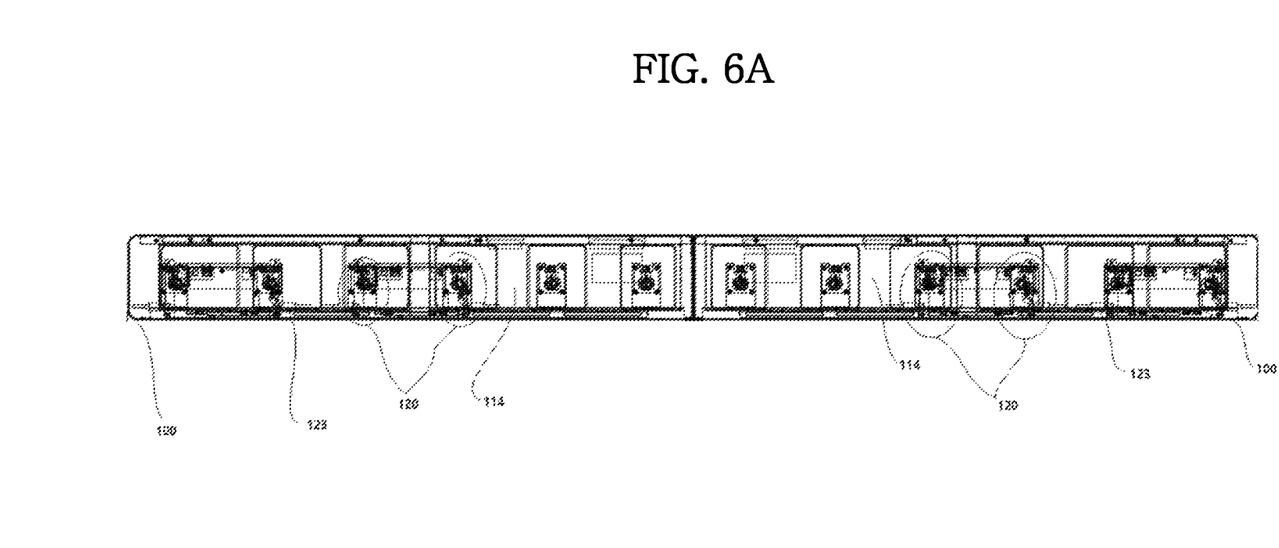
FIGS. 6A and 6B are a front projection view and a side projection view, respectively, of an imaging apparatus including at least one or more imaging units, according to an embodiment of the present disclosure.
Figure 6B:
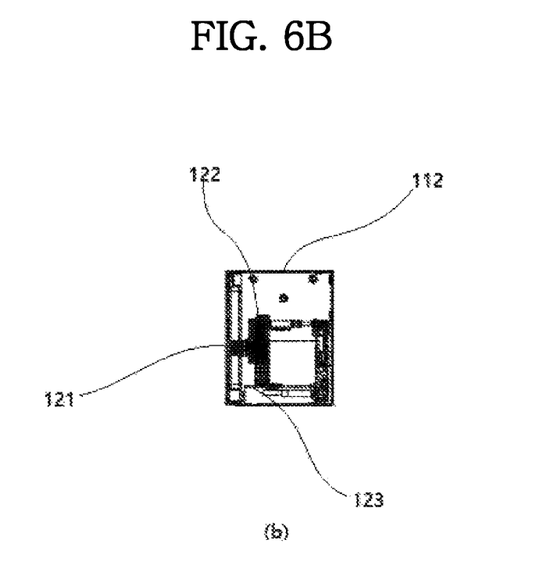
Figure 7:
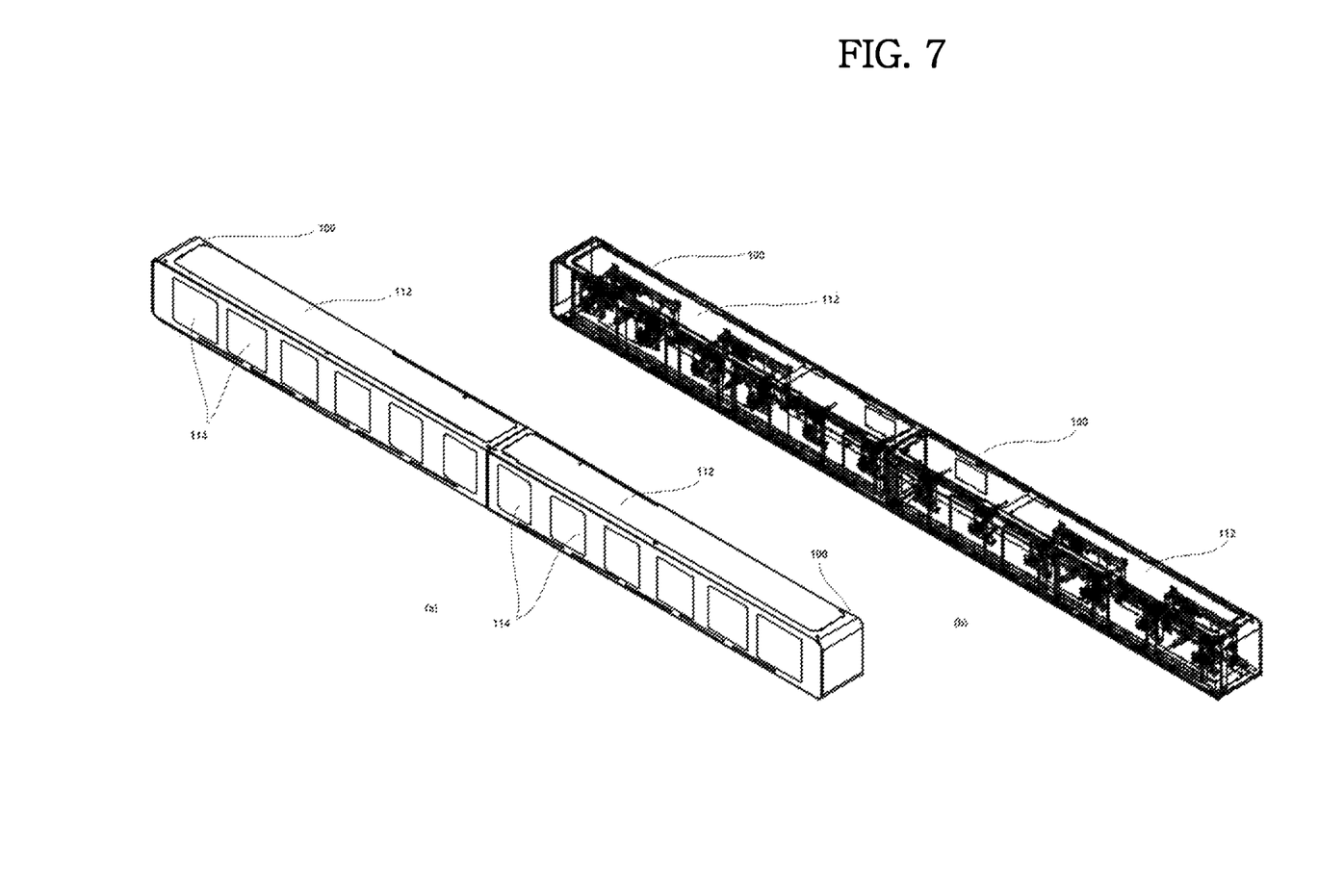
FIGS. 7A and 7B are a perspective view and a perspective projection view, respectively, illustrating a shape in which modules of an imaging apparatus including at least one or more imaging units are connected to each other in a linear direction, according to an embodiment of the present disclosure.

FIG. 5 is a top projection view of an imaging apparatus including at least one or more imaging units, according to an embodiment of the present disclosure, FIGS. 6A and 6B are a front projection view and a side projection view, respectively, of an imaging apparatus including at least one or more imaging units, according to an embodiment of the present disclosure, and FIGS. 7A and 7B are a perspective view and a perspective projection view, respectively, illustrating a shape in which modules of an imaging apparatus including at least one or more imaging units are connected to each other in a linear direction, according to an embodiment of the present disclosure.

FIGS. 5 to 7B illustrate an imaging apparatus in which the modules 100 connected in a straight line do not form an arc.

To this end, at least two modules 100 are connected to each other, and the at least two modules 100 may be connected to each other in a linear direction to be coupled.

In addition, the module case 110 may include an imaging unit angle adjustment unit for adjusting an installation angle of the imaging units 120 on an inner lower side of the module case 110.

According to the embodiments of the present disclosure illustrated in FIGS. 5 to 7B, the modules 100 may be connected to each other in a linearly extending manner, and an arc that uses a predetermined distance separated from a subject as a radius may be formed by adjusting an installation angle of the imaging unit 120 which is inserted into the module case 110.

In this case, the above-described configuration of the module according to the embodiment of the present disclosure may be used in the same manner, and there is a difference in which the installation angle of the imaging unit 120 may be changed.

The imaging unit 120 may change installation angles of the imaging units provided in the module based on a predetermined point to form an arc by using a predetermined distance equally spaced toward one subject as a radius, and it is more preferable to change the installation angles of the imaging units arranged on the left and right of a central imaging unit of a central module among the connected modules by considering a change in the installation angles of the imaging units 120.

According to an embodiment of the present disclosure, a guide for an installation angle may be expressed in the position adjustment unit 113 provided inside the module case 110, and a general person may change the installation angle of the imaging unit 120 according to the guide for the installation angle expressed on the position adjustment unit 113 by using a set distance to a subject and considering the installation angle.

With the above-described configuration, a user can more easily and conveniently capture time-slice images in a certain time domain by using a timer control method or a remote control method, and an imaging apparatus set may be stored in a small space by quickly disassembling and assembling the imaging apparatus, and a lightweight imaging apparatus may be easily transported.

The above description is merely illustrative of the technical idea of the present disclosure, and those skilled in the art to which the present disclosure belongs will be able to make various modifications and variations without departing from the essential characteristics of the present disclosure. Accordingly, the embodiments disclosed in the present disclosure are not intended to limit the technical idea of the present disclosure but to describe the technical idea, and the scope of the technical idea of the present disclosure is not limited to the embodiments. The scope of protection of the present disclosure should be interpreted by the following claims, and all technical ideas within the scope equivalent thereto should be construed as being included in the scope of the present disclosure.

What is claimed is:

1. An imaging apparatus comprising:
    at least two modules (100) connected to each other; and
    a module angle adjustment unit that adjusts an installation angle between the modules (100),
    wherein the module (100) comprises:
    a module case (110) constituting an outside of the module (100); and
    at least one or more imaging units (120) provided inside the module case (110)
    wherein the imaging unit (120) comprises:
    an imaging body (121) including a lens and an image sensor;
    a control board (122) connected to the imaging body (121) to control the imaging body (121) and to process imaging information; and
    a fixing plate (123) including multiple processing holes (123a) formed to fix the fixing plate (123) onto an inner lower side of the module case (110),
    wherein the module case (110) comprises:
    a cover (112) that is formed on an upper surface of the module case (110) and is attachable and detachable;
    a position adjustment unit (113) provided on the inner lower side of the module case (110) to adjust an installation position of the imaging unit (120); and
    a front plate (114) that covers a front surface of the module case facing the imaging unit (120).

2. The imaging apparatus of claim 1, wherein the module angle adjustment unit is fixed to a lower portion or an upper portion of the module case (110) and includes multiple adjustment points connected between adjacent module cases (110) and capable of adjusting the installation angle between the modules (100) by considering a distance to a subject to be imaged.

3. The imaging apparatus of claim 1, further comprising:
    a support connected to lower portions of the modules (100) to fix the modules (100).

4. The imaging apparatus of claim 3, wherein the support includes a connection portion formed on an uppermost end of the support so as to be fixed to the module case (110).

5. The imaging apparatus of claim 3, wherein the support includes a height adjustment portion for adjusting a height of the module (100) connected to an upper portion of the support.

6. An imaging apparatus comprising:
    one or more modules (100) connected to each other,
    wherein each of the modules (100) comprises:
    a module case (110) constituting an outside of the module (100); and
    at least one or more imaging units (120) provided inside the module case (110), and
    wherein the modules (100) are coupled to each other in a linear direction,
    wherein the imaging unit (120) comprises:
    an imaging body (121) including a lens and an image sensor;
    a control board (122) connected to the imaging body (121) to control the imaging body (121) and to process imaging information; and a fixing plate (123) including multiple processing holes (123*a*) formed to fix the fixing plate (123) onto an inner lower side of the module case (110), wherein the module case (110) comprises:

a cover (112) that is formed on an upper surface of the module case (110) and is attachable and detachable;

a position adjustment unit (113) provided on the inner lower side of the module case (110) to adjust an installation position of the imaging unit (120); and a front plate (114) that covers a front surface of the module case facing the imaging unit (120).

7. The imaging apparatus of claim 6, wherein the module case (110) includes an imaging unit angle adjustment unit formed on an inner lower side of the module case (110) to adjust an installation angle of the imaging unit (120).

* * * * *